United States Patent
Ikeda

(10) Patent No.: US 6,371,669 B1
(45) Date of Patent: Apr. 16, 2002

(54) PRINTER CONTROLLER

(75) Inventor: Hidetoshi Ikeda, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/514,844

(22) Filed: Feb. 28, 2000

(30) Foreign Application Priority Data

Mar. 2, 1999 (JP) .......................................... 11-054108

(51) Int. Cl.$^7$ ................................................. B41J 5/30
(52) U.S. Cl. ......................................... 400/63; 400/74
(58) Field of Search ....................... 400/63, 74; 399/72, 399/130, 301; 358/510, 526; 347/116, 154

(56) References Cited

U.S. PATENT DOCUMENTS 5,373,355 A * 12/1994 Ando et al. .................. 399/301
5,587,771 A * 12/1996 Mori et al. .................... 399/72
6,215,512 B1 * 4/2001 Imaizumi et al. ............ 347/234

* cited by examiner

Primary Examiner—John S. Hilten
Assistant Examiner—Minh H. Chau
(74) Attorney, Agent, or Firm—Ratner & Prestia

(57) ABSTRACT

A printer controller provides print data to a tandem color image generator containing a plurality of electro-photographic image forming devices. The printer controller includes a receiving buffer region for receiving print data from a data input unit; an MPU operation processing region for operating the MPU; a graphic processing region for executing graphic processes; a display list region for storing, as description list covering at least one print page, the print data delivered from the data input unit; a raster data storage region for storing, as raster data, the print data kept in the display list region; a corrected raster data storage region for storing the corrected data of raster data generated by a skew.multiplying factor corrector, which corrector correcting the skew errors.multiplying factor errors, for delivery to the color image former; and a data memory. Since the skew.multiplying factor correction is executed on the raster data after being forwarded into print data, the printing dislocation at color image former caused by mechanical factors can be corrected by the printer controller.

10 Claims, 12 Drawing Sheets

PRINTER CONTROLLER

FIELD OF THE INVENTION

The present invention relates to a printer controller of color printer; more specifically, a printer controller that detects relative dislocation among colors in an electro-photographic tandem color image generator that uses a plurality of photosensitive elements. The detection of color dislocation is for the purpose of precise color alignment on a recording medium.

BACKGROUND OF THE INVENTION

A data flow of in a conventional color image forming device is shown in FIG. 10.

An electro-photographic printer 31 generates an image based on print data delivered from a personal computer 30 (or a CAD, a work station, a digital camera or the like) to the printer 31 via an interface.

The printer 31 is formed of a printer controller and a color image generator (sometimes referred to as "printer engine", depending on situation).

The printer controller receives print data of a document to be printed delivered in the form of a mixture of print language and bit map data, or the like, and converts the data into raster data to enable a printer engine form an image. The printer engine forms a latent image in accordance with the raster data delivered form the printer controller. An image is thus created.

An image forming process in the electro-photography is described more in detail. A photosensitive drum, or an image carrier, is charged by a charger, and then irradiated with light in accordance with image information. A latent image thus formed is developed by a developer to become a toner image, which image is transferred on paper, or such other material that is an object of the transfer (hereinafter referred to as "transfer material").

A tandem color image former as illustrated in FIG. 11 is proposed to better meet the needs of color image era.

As shown in FIG. 11, the color image generator comprises four image generating devices (hereinafter referred to as "imaging station") 1a, 1b, 1c, 1d, each of the imaging stations 1a, 1b, 1c, 1d is provided with a photosensitive drum (photosensitive element) 2a, 2b, 2c, 2d, respectively. Disposed around the drum includes a charger 3a, 3b, 3c, 3d, a developer 4a, 4b, 4c, 4d, a cleaner 5a, 5b, 5c, 5d, an exposure device having scanning optical system 6a, 6b, 6c, 6d, and a transfer device 8a, 8b, 8c, 8d for transferring toner image on a transfer belt 12, which being a part of transfer means 7.

At imaging stations 1a, 1b, 1c, 1d, an image is formed in yellow, in magenta, in cyan and in black, respectively. Exposure devices 6a, 6b, 6c, 6d irradiate exposure lights 9a, 9b, 9c, 9d, respectively, corresponding to the yellow image, magenta image, cyan image and black image.

Underneath the photosensitive drum 2a, 2b, 2c, 2d, an endless transfer belt 12 is provided, supported by rollers 10 and 1. The belt circulates in a direction as indicated with an arrow A.

A pattern detection device 14 is provided facing the transfer belt 12 for detecting a location detection pattern generated by location detection pattern generating means 13.

Transfer materials 17 stored in a paper dispenser cassette 16 are delivered via a paper feeding roller 18 to a transfer roller 19, a fixer 20, eventually to a paper tray (not shown).

In a color image generator of the above configuration, a black latent image is formed at the imaging station 1d on the photosensitive drum 2d by a known electro-photographic process. The latent image is developed at the developer 4d with a developer material containing black toner into visible black toner image. The black toner image is transferred at the transfer device 8d on the transfer belt 12.

While the black toner image is being transferred on the transfer belt 12, a cyan latent image is formed at the imaging station 1c. The latent image is developed at the developer 4c with a cyan toner into visible cyan toner image. The cyan toner image is transferred at the transfer device 8c to be overlaid on the black toner image.

Magenta toner image and yellow toner image formed through the same procedure are likewise transferred on the transfer belt 12. When the toner images of four colors are overlaid into a single image on the transfer belt 12, the complete toner image of four colors is transferred by the transfer roller 19 on paper or other such transfer material 17 delivered via feeding roller 18 from the paper dispenser cassette 16. The transferred image is fixed by heating at the fixer 20 as a full-color image on the transfer material 17.

After finishing the image transfer, the residual toner staying on the photosensitive drum 2a, 2b, 2c, 2d is removed by a cleaner 5a, 5b, 5c, 5d, and the photosensitive drum is ready for the next image formation.

The tandem color image generator of the above described configuration is advantageous in that it can provide color images at a high speed, since the image generator has independent imaging stations 1a–1d, each capable of forming a color image.

The above described tandem color image former, however, has a problem in how to precisely overlay respective images formed at independent imaging stations 1a–1d (viz. registration). The relative dislocation existing among the four color images transferred on the transfer material 17 eventually reveals itself as the dislocation or the color change in a finished picture.

There are five kinds of dislocations in the transferred image. FIG. 12(a) illustrates a dislocation in the direction of transfer (the direction indicated with arrow symbol A) of transfer material (hereinafter referred to as "sub scanning dislocation"); FIG. 12(b) illustrates a dislocation in the direction of scanning (direction perpendicular to the arrow symbol A) (hereinafter referred to as "main scanning dislocation"); FIG. 12(c) illustrates a dislocation in an oblique direction (hereinafter referred to as "skew error"); FIG. 12(d) illustrates a dislocation caused by an error in the magnification factor; and FIG. 12(e) illustrates a dislocation due to curve error. In practical cases the dislocation appears as an integration of these causes.

The sub scanning dislocation shown in FIG. 12(a) stems mainly from dislocated installations of imaging stations 1a–1d, optical scanning systems, and dislocation of constituent lenses and mirrors (not shown) within the scanning optical system or such other reasons that come from mechanical causes. The main scanning dislocation shown in FIG. 12(b) also stems from the same reasons. The dislocation in an oblique direction shown in FIG. 12(c) is due to a dislocated angle of a revolving shaft of a photosensitive drum in the imaging stations 2a–2d, or dislocated installation of the optical scanning system. The dislocation due to error in the magnification factor shown in FIG. 12(d) stems from the variation in the length of scanning line caused as a result of an error in the length of light path from respective optical scanning system to the photosensitive drum 2a–2d at imaging station 1a–1d. The dislocation due to the curve error shown in FIG. 12(e) is caused by a dislocated assembly of lenses, or the like within optical scanning system. Namely, in all of the above cases, the errors are due to mechanical factors.

SUMMARY OF THE INVENTION

A printer controller for delivering print data to a color image generator containing a plurality of image forming devices. The printer controller comprises a receiving buffer region for receiving a certain print data delivered from a source of data input, a display list region for storing, as a description list covering at least one print page, the print data stored in the receiving buffer region, a raster data storage region for storing, as raster data, the print data kept in the display list region, and a corrected raster data storage region for storing the raster data stored in the raster data storage region after being corrected by a skew.multiplying factor corrector, which corrector corrects the skew.multiplying factor that reveal themselves as the relative error at the time when an image is formed. The corrected raster data are delivered to a color image former.

The present invention provides a technology that corrects the dislocation an image by a printer controller in the color image former.

DESCRIPTION OF THE PREFERRED EMBODIMENT

Figure 1:
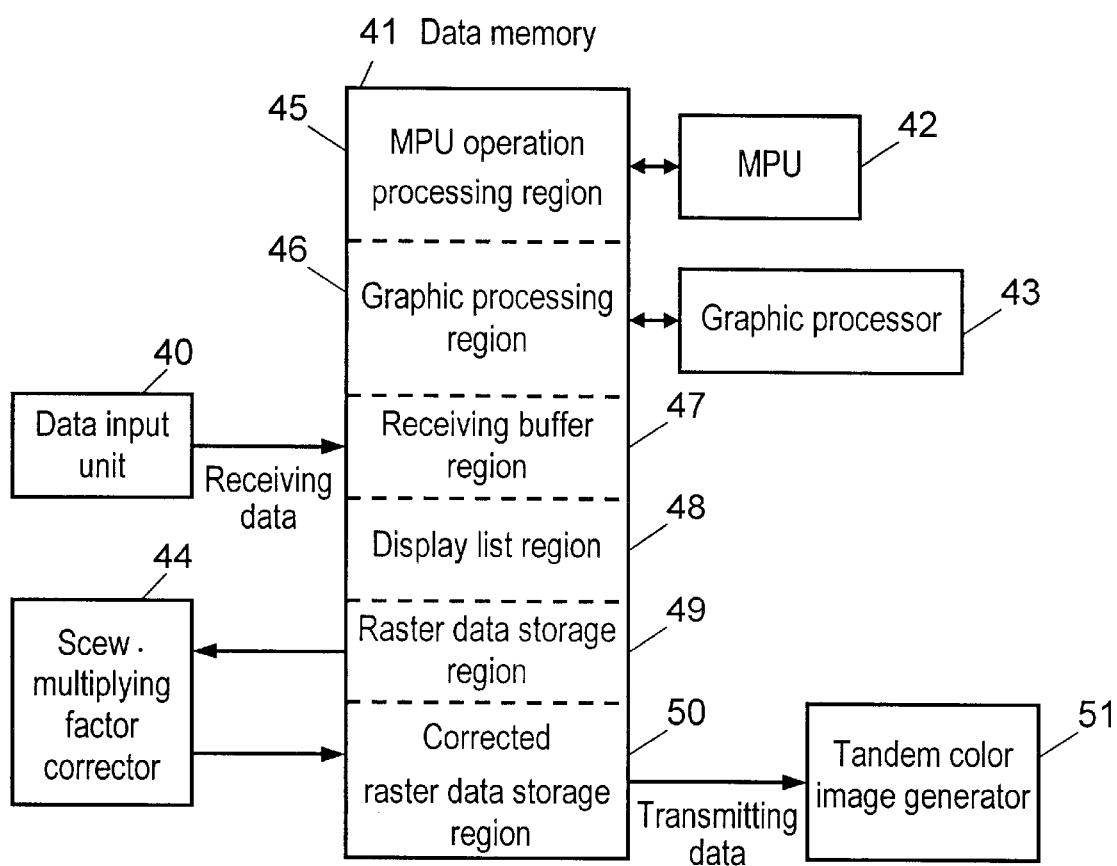
FIG. 1 shows a block diagram of a printer controller in accordance with a first exemplary embodiment of the present invention.

Exemplary embodiments of the present invention are described in the following with reference to FIG. 1 through FIG. 9. In the drawings, descriptions of similar items are not repeated.

First Embodiment

Figure 2:
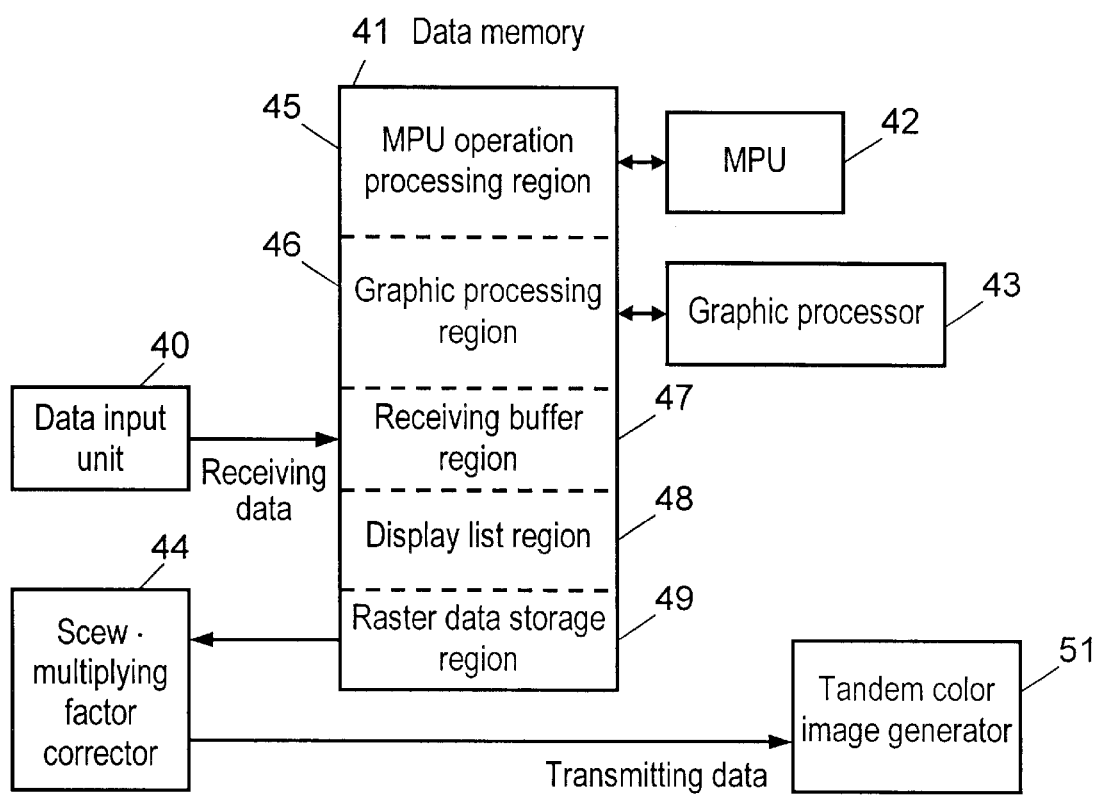
FIG. 2 shows a block diagram of another example of a printer controller in a first embodiment.

FIG. 1 is a block diagram showing an example of a printer controller in a first embodiment of the present invention, while FIG. 2 shows another example of a printer controller in this embodiment.

As shown in FIG. 1, a printer controller of the present invention includes data input unit 40, one or pluralities of data memory 41 for receiving data from the data input unit 40, a microprocessor (MPU) 42 and a graphic processor 43 linked with the data memory 41, and a skew.multiplying factor corrector 44 that exchanges data with the data memory 41.

The data memory 41 is connected to a tandem color image generator (hereinafter referred to as "image generating device") 51, to which the data memory 41 delivers data.

The data memory 41 includes a receiving buffer region 47 for receiving print data such as print language data, bit map data, from the data input unit 40, an MPU operation processing region 45 for operating the MPU 42, which region being formed of an operating system region, an instruction region, a variables region and other processing regions, a graphic processing region 46 for a graphic processor 43 to execute font treatment, rotation, varying in the multiplying factor, compression/decompression, color conversion, halftone treatment and other graphic processing in accordance with instruction of the MPU 42 or an exclusive hardware, a display list region 48 for storing, as description list covering at least one printing page, the print data delivered, a raster data storage region 49 for storing, as raster data, the print data kept in display list region 48 so that the data can be used in the image forming device 51, and a corrected raster data storage region 50 for storing the raster data stored in the raster data storage region 49 after being corrected by a skew.multiplying factor corrector 44, which corrector corrects the skew errors/the multiplying factor errors that reveal themselves as the relative error at the time when an image is printed on paper.

Next, the operation of above configured printer controller is described.

When print language data, bit map data from an image scanner or a digital camera are delivered from the data input unit 40, the printer controller stores the data at receiving buffer region 47 in the data memory 41.

MPU 42 takes part of translation of the print language data and storage region control of the bit map data, and stores the data as a display list at display list region 48 in the data memory 41. The graphic processor 43 conducts the font development operation, enlarging/shrinking, rotating, color conversion, binarization and other processing, in accordance with the display list. The MPU 42 generates raster data and delivers the data to raster data storage region 49 in the data memory 41.

The MPU 42 reads out the raster data from the skew.multiplying factor corrector 44, provides the data with a certain correction, and then returns the data for storage to the corrected raster data storage region 50 in the data memory 41. As soon as the storage operation is finished, the MPU 42 delivers the corrected data to tandem color image former 51 to start the printing operation.

In the above described structure of the present invention, where the raster data undergo a correction in terms of the skew/multiplying factor after being forwarded into the print data, the printer controller can correct printing dislocation at an image forming device.

Since it is possible to overwrite corrected data on the pre-correction data when storing the corrected data in the corrected raster data storage region 50, the data memory 41 does not need to be increased in the memory capacity. Thus, an inexpensive image forming device can be obtained.

The data that were read out from raster data storage region 49 and corrected by the skew.multiplying factor corrector 44 may be delivered directly to the image forming device 51, as illustrated in FIG. 2. By so doing, the time used for writing and reading out the corrected data is eliminated. Thus the processing speed is increased under the present configuration, as compared with the example in FIG. 1.

Correcting coefficient for the skew.multiplying factor corrector 44 may be determined either by a correction amount parameter obtained based on the result of automatic measurement conducted in the image forming device 51, or by measuring the amount of skew.multiplying factor from an image formed in response to data for correction measurement delivered to image forming device 51. Furthermore, the correcting coefficient may be determined based on the amount of skew.multiplying factor correction measured at the manufacturing stage of image forming device 51, by reading it through the image forming device 51, or by reading it out from the data input means 40. The amount of correction may be determined in a simplified manner by using one of these methods.

Second Embodiment

Figure 3:
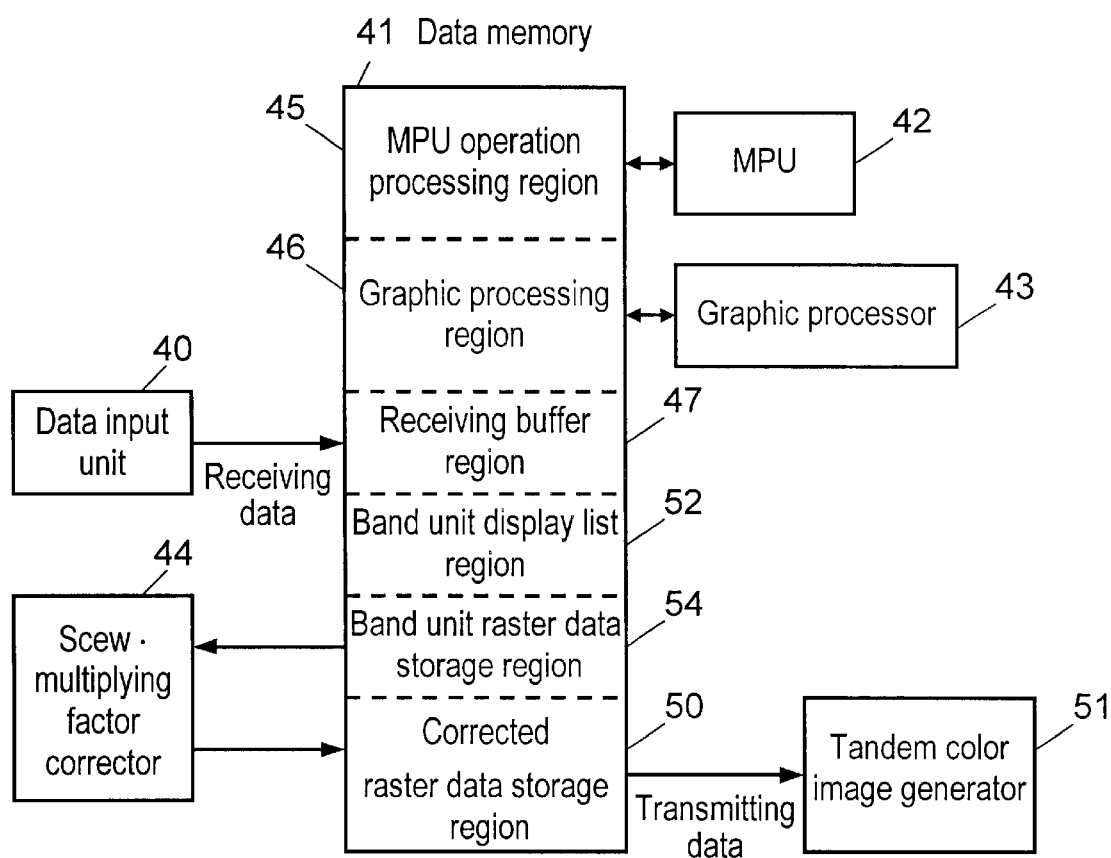
FIG. 3 shows a block diagram of a printer controller in accordance with a second exemplary embodiment of the present invention.
Figure 4:
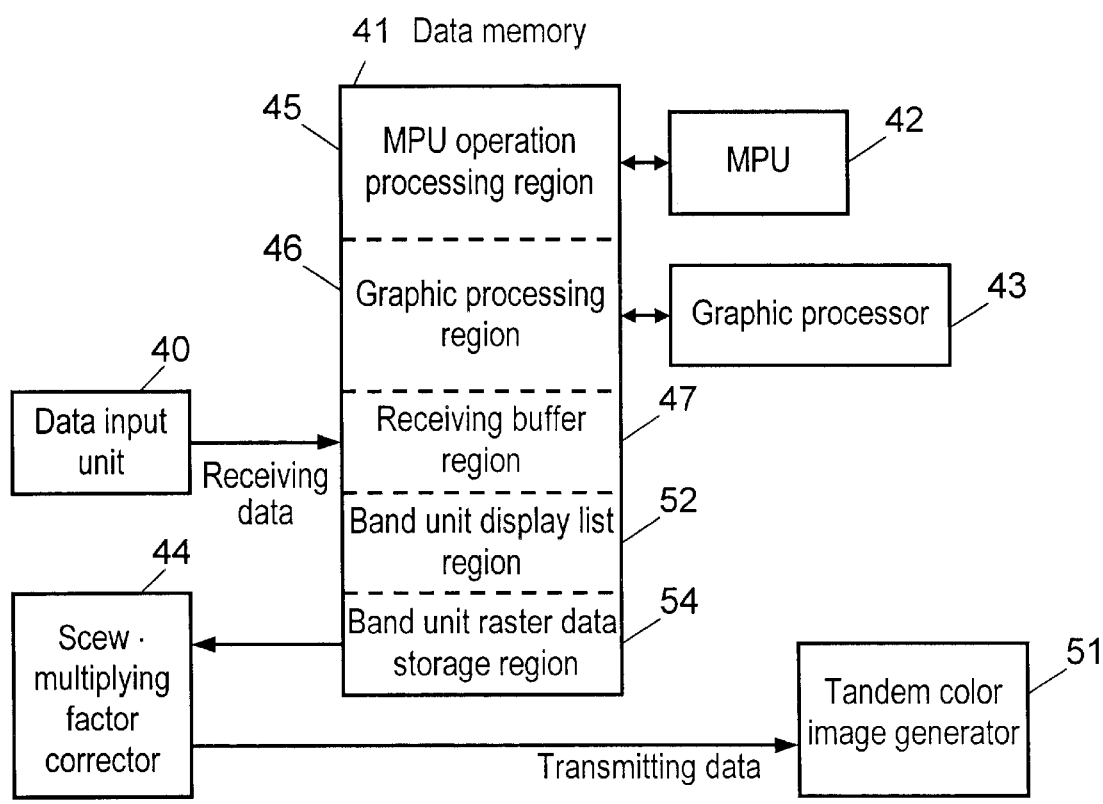
FIG. 4 shows a block diagram of another example of a printer controller in a second embodiment.

FIG. 3 is a block diagram showing an example of a printer controller in accordance with a second embodiment of the present invention, while FIG. 4 shows another example of a printer controller in this embodiment.

In FIG. 3, a data memory 41 includes
a receiving buffer region 47 for receiving print data,
an MPU operational processing region 45 for operating the MPU 42,
a graphic processing region 46,
a band unit display list region 52 for storing, as band unit description list, the print data for one print page divided into n bands in the sub-scanning direction of printing at image forming device 51,
a band unit raster data storage region 54 for storing, as band unit raster data, the print data kept in the band unit display list region 52 so that the data can be used in the image forming device 51, and
a corrected raster data storage region 50 for storing the raster data stored in the band unit raster data storage region 54 after being corrected by a skew.multiplying factor corrector 44, which corrector corrects the skew errors/the multiplying factor errors that reveal themselves as the relative error at the time when an image is printed on paper.

Next, the operation of above configured printer controller is described.

When print language data or bit map data are delivered from the data input unit 40, the printer controller stores the data in the data memory 41 at receiving buffer region 47.

MPU 42 takes part of translation of the print language data and storage region control of the bit map data dividing one print page into n bands, and stores the data, as a display list, at band unit display list region 52 in the data memory 41.

The graphic processor 43 conducts the font development operation, enlarging/shrinking, rotation, color conversion, binarization and other processing. The MPU 42 generates raster data and delivers the data to the data memory 41 to be stored at band unit raster data storage region 54 as No. N+1 band raster data.

The MPU 42 reads out raster data stored in the area one band ahead, viz. No. N band raster data, through the skew-.multiplying factor corrector 44, provides the data with a certain correction, and then returns the data to the data memory 41 to be stored at the corrected raster data storage region 50. As soon as the storage operation is finished, the MPU 42 delivers the corrected data to image forming device 51 to make the printing operation started.

Since it is possible to overwrite the corrected data on pre-correction data when the MPU 42 corrects No. N band raster data and stores the corrected data in the corrected raster data storage region 50, the data memory 41 does not need to be increased in the memory capacity. Thus, an inexpensive image forming device 51 can be obtained.

The No. N band raster data read out by MPU 42 from the band unit raster data storage region 54 and corrected by the skew.multiplying factor corrector 44 may be delivered direct to the image forming device 51, as illustrated in FIG. 4. By so doing, the time used for writing and reading out the corrected data is eliminated. Thus the processing speed is increased as compared with the example in FIG. 3.

A correcting coefficient for the skew.multiplying factor corrector 44 may be determined in the same manner as in the first embodiment. Thus the correction value may be determined in a simplified manner.

Third Embodiment

Figure 5:
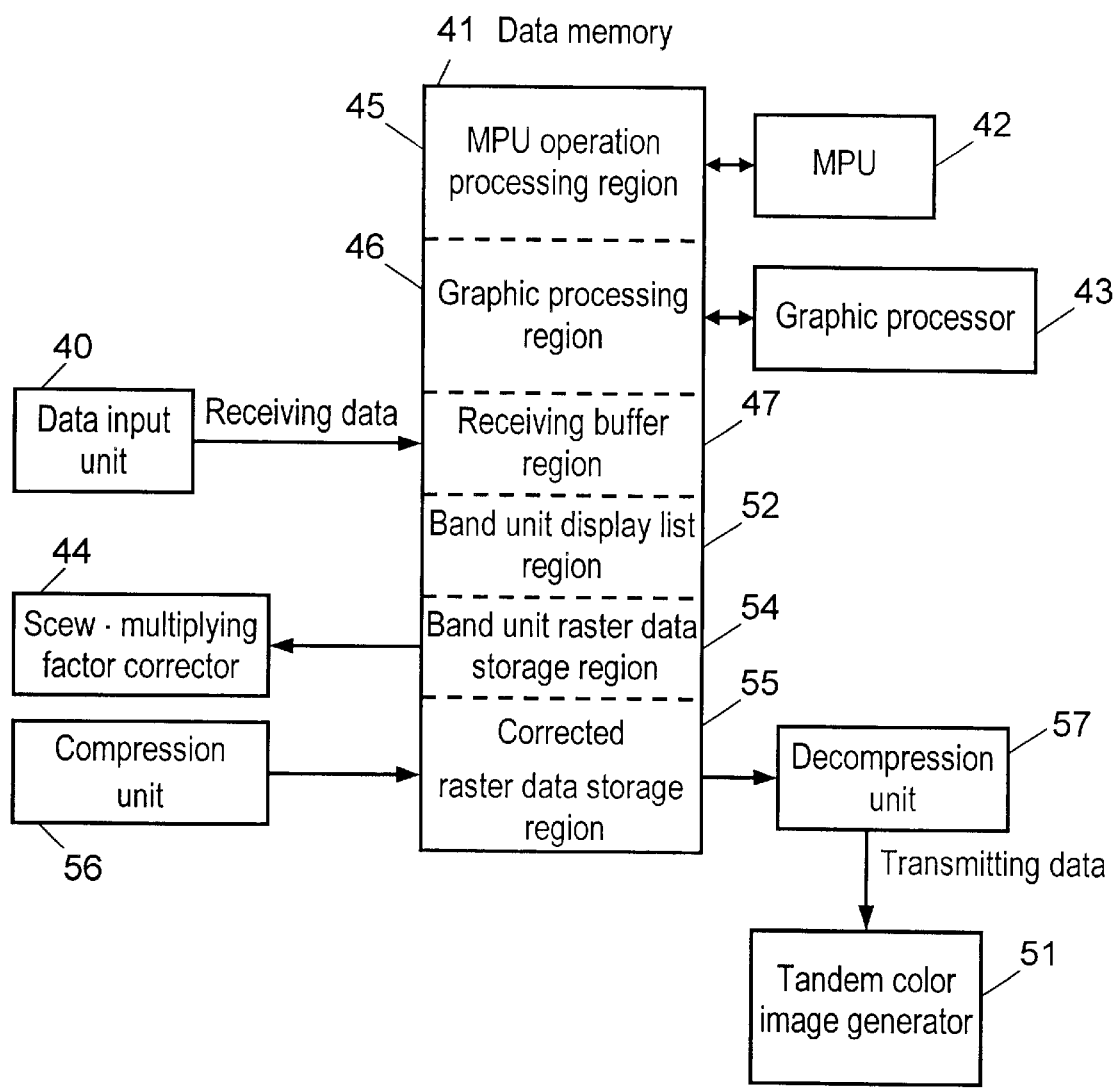
FIG. 5 shows a block diagram of a printer controller in accordance with a third exemplary embodiment of the present invention.

FIG. 5 is a block diagram showing an example of a printer controller in a third embodiment.

As shown in FIG. 5, a printer controller in a third embodiment 3 includes data input means 40,
a data memory 41,
an MPU 42 and a graphic processor 43 linked with the data memory 41,
a skew.multiplying factor corrector 44,
compression unit 56 for compressing the corrected raster data generated by the skew.multiplying factor corrector 44, and
decompression unit 57 for restoring the compressed corrected data to initial raster data.

The data memory 41 is connected to image forming device 51.

The data memory 41 includes
a receiving buffer region 47 for receiving print data,
an MPU operation processing region 45,
a graphic processing region 46,
a band unit display list region 52,
a band unit raster data storage region 54, and
a corrected and compressed raster data storage region 55 for storing the raster data stored in band unit raster data storage region 54 after being corrected by the skew.multiplying factor corrector 44, which corrector corrects the skew errors/the multiplying factor errors that reveal themselves as the relative error at time when an image is printed on paper, and compressed at a compression means 56.

Next, the operation of above configured printer controller is described.

When print language data or bit map data are delivered from the data input means 40, the printer controller stores the data in the data memory 41 at receiving buffer region 47.

MPU 42 takes part of translation of the print language data and storage region control of the bit map data dividing one print page into n bands, and stores the data, as a display list, at band unit display list region 52 in the data memory 41. The graphic processor 43 conducts the font development operation, enlarging/shrinking, rotation, color conversion, binarization and other processing in accordance with the display list. The MPU 42 generates raster data and delivers the data to the data memory 41 to be stored at band unit raster data storage region 54 as No. N+1 band raster data.

The MPU 42 reads out raster data stored in an area one band ahead, viz. No. N band raster data, through the skew-.multiplying factor corrector 44, provides the data with a certain correction, and then returns the data to the data memory 41, after providing with a certain compression, to be stored at the corrected and compressed raster data storage region 55. As soon as the storage operation is finished, the MPU 42 delivers the compressed data, after decompressing them at a decompression means 57 to the initial raster data, to the image forming device 51 to have the printing operation started.

Since it is possible to overwrite the corrected data on pre-correction data when correcting the No. N band raster data and storing them in the corrected and compressed raster data storage region 55, the data memory 41 does not need to be expanded in the memory capacity. In addition, since the corrected data are compressed by the compression means 56, the memory capacity of data memory 41 can be made smaller. Thus, in accordance with the present embodiment, a color image former can be implemented at a still lower cost.

A method of compression is not restricted in this invention. Many well-known compression methods such as JPEG compression, MH compression, MR compression, MMR compression or the like method may be used.

A correcting coefficient for the skew-multiplying factor corrector 44 may determined in the same manner as in embodiment 1. Thus an image forming device is obtained in which the correction value may be determined in a simplified manner.

Fourth Embodiment

Figure 6:
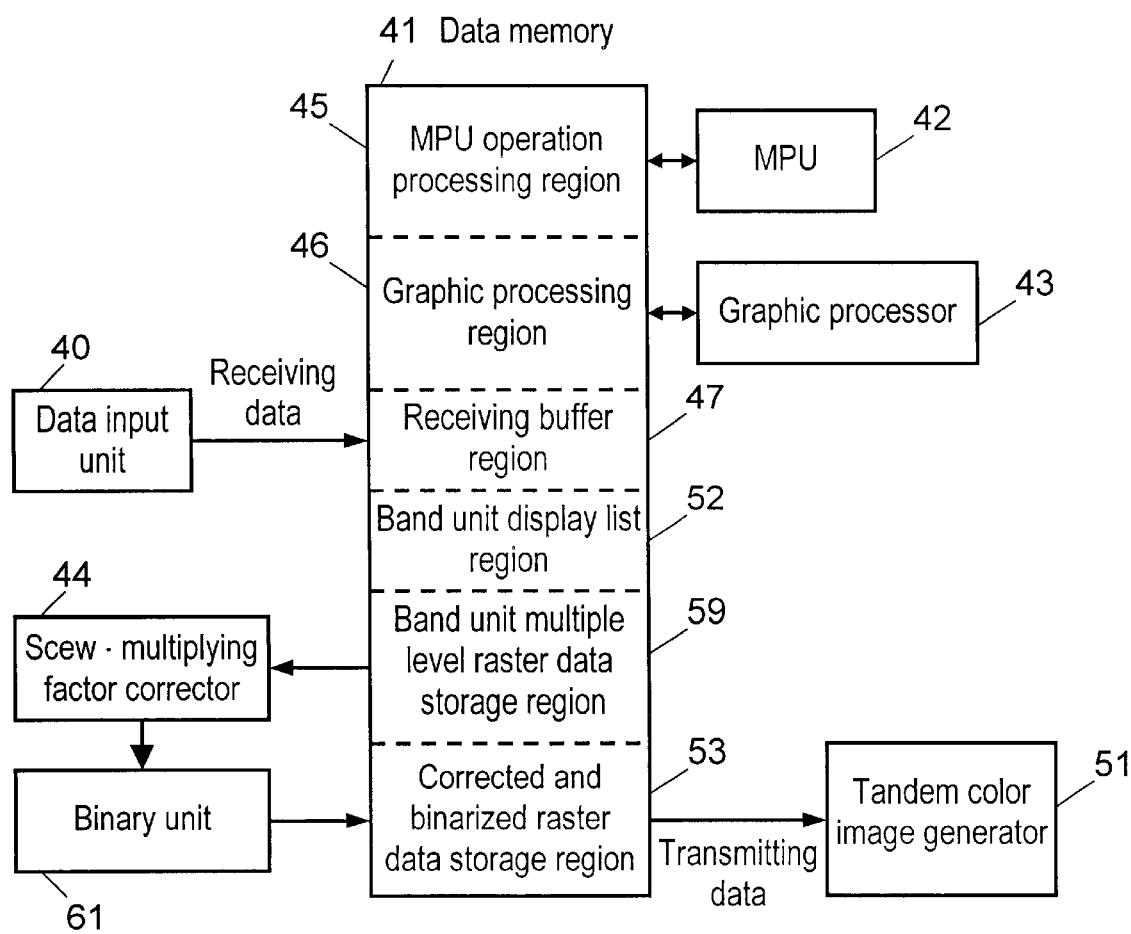
FIG. 6 shows a block diagram of a printer controller in accordance with a fourth exemplary embodiment of the present invention.
Figure 7:
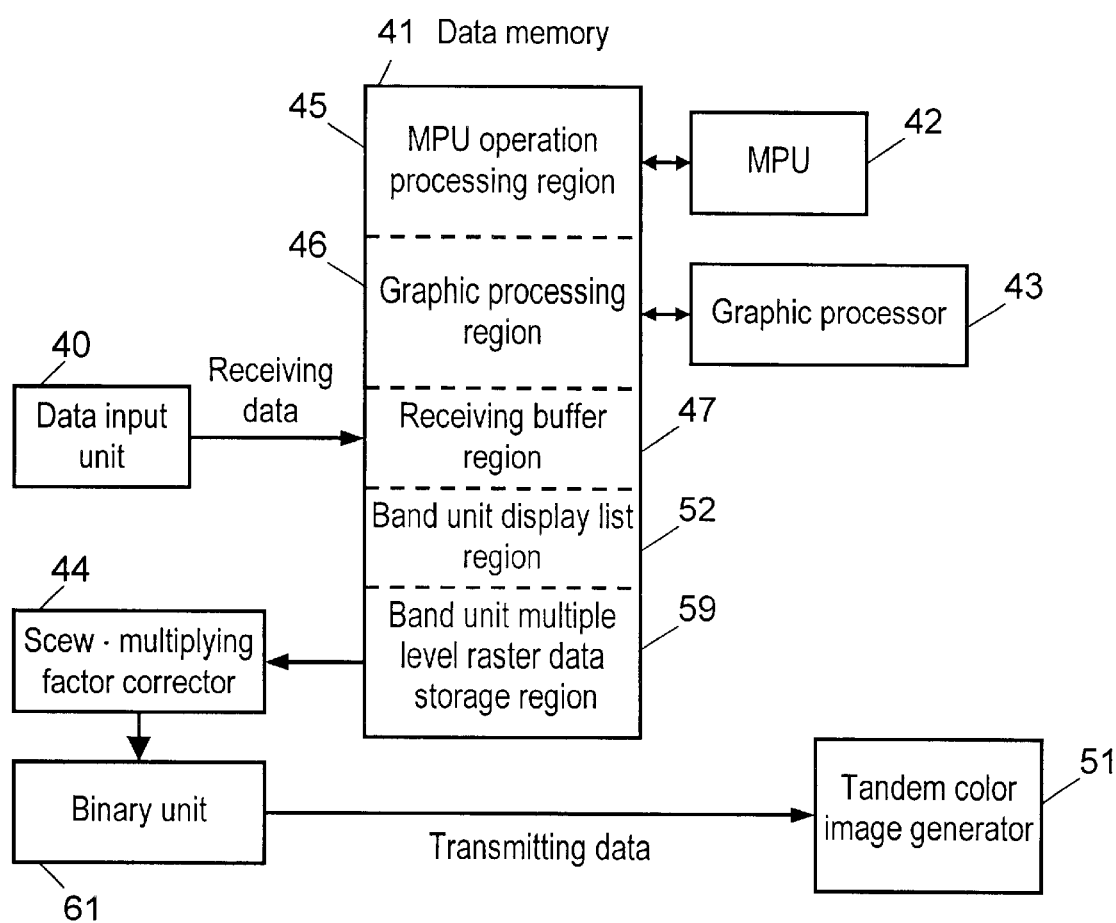
FIG. 7 shows a block diagram of another example of a printer controller in a fourth exemplary embodiment.

FIG. 6 is a block diagram showing an example of a printer controller in accordance with a fourth embodiment of the present invention, while FIG. 7 shows another example of printer controller in this embodiment.

As shown in FIG. 6, a printer controller in exemplary embodiment 4 includes
 data input unit 40,
 a data memory 41,
 an MPU 42 and a graphic processor 43 linked with the data memory 41, a skew.multiplying factor corrector 44, and
 binary unit 61 for binarizing the corrected raster data generated by the skew.multiplying factor corrector 44.

The data memory 41 is connected to an image forming device 51.
 The data memory 41 includes
 a receiving buffer region 47,
 an MPU operational processing region 45,
 a graphic processing region 46,
 a band unit display list region 52,
 a band unit multiple level raster data storage region 59, and
 a corrected and binarized raster data storage region 53 for storing the raster data stored in the band unit multiple level raster data storage region 59 after being corrected by the skew.multiplying factor corrector 44, which corrector corrects the skew errors/the multiplying factor errors that reveal themselves as the relative error at the time when an image is printed on paper, and binarized at the binary means 61.

Next, the operation of above configured printer controller is described.

When print language data or bit map data are delivered from the data input means 40, the printer controller stores the data in the data memory 41 at receiving buffer region 47.

MPU 42 takes part of the translation of the print language data and storage region control of the bit map data dividing one print page into n bands, and stores the data as display list at band unit display list region 52 in the data memory 41. The graphic processor 43 conducts the font development operation, enlarging/shrinking, rotation, color conversion and other processing in accordance with the display list. The MPU 42 generates multiple level raster data and delivers the data to the data memory 41 to be stored at band unit multiple level raster data storage region 59 as No. N+1 band multiple level raster data.

The MPU 42 reads out raster data stored in an area one band ahead, viz. No. N band raster data, from the skew-.multiplying factor corrector 44, provides the data with a certain correction, and then converts into binary data at a binary means 61. The MPU 42 returns the data to the data memory 41 to be stored in the corrected and binarized raster data storage region 53. As soon as the storage operation is finished, the MPU 42 delivers the corrected data to the image forming device 51 to have the printing operation started.

Since it is possible to overwrite the corrected data on pre-correction data when correcting and binarizing the No. N band multiple level raster data and storing the data in the corrected and binarized raster data storage region 53, the data memory 41 does not need to be increased in the memory capacity. Thus an image forming device can be implemented at a lower cost in accordance with the present embodiment. Furthermore, since the correction is conducted on the multiple level data, the result of correction is precise and free from the jaggy phenomenon, which often arises as a result of bi-level correction.

Furthermore, as shown in FIG. 7, the No. N band multiple level raster data read out from band unit multiple level raster data storage region 59, corrected by the skew.multiplying factor corrector 44 and converted into binary data at the binary means 61 may be delivered direct to tandem image former 51. By so doing, the time used for writing in and reading out the binarized data is eliminated. Thus processing speed is increased, as compared with the example in FIG. 6.

A correcting coefficient for the skew.multiplying factor corrector 44 may be determined in the same manner as in the first embodiment. Thus an image forming device is obtained in which the correction value may be determined in a simplified manner.

Fifth Embodiment

Figure 8:
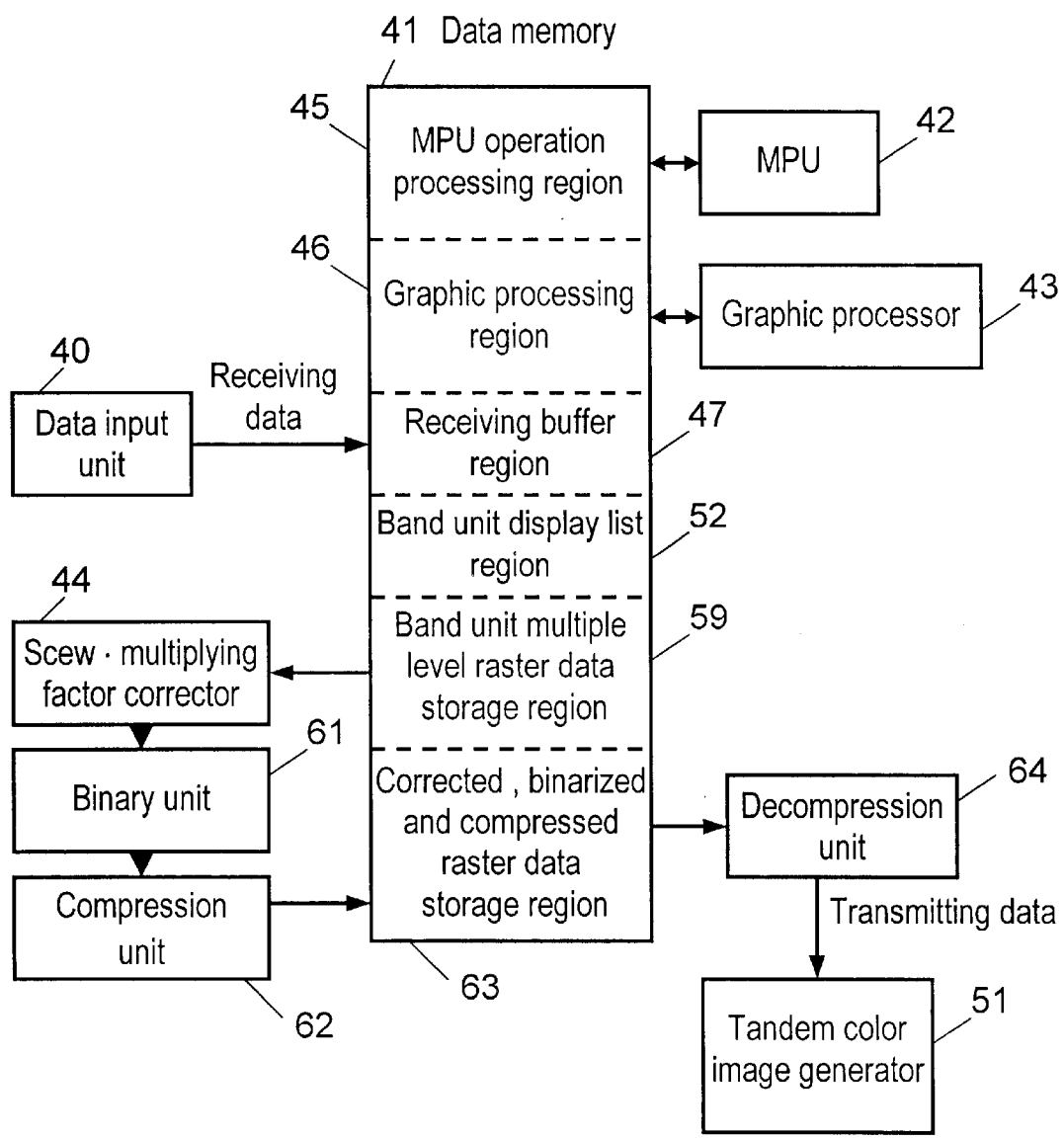
FIG. 8 shows a block diagram of a printer controller in accordance with a fifth exemplary embodiment of the present invention.

FIG. 8 is a block diagram showing an example of printer controller in a fifth embodiment.

As shown in FIG. 6, a printer controller in the fifth embodiment 5 includes
 data input unit 40,
 a data memory 41,
 an MPU 42 and a graphic processor 43 linked with the data memory 41, a skew.multiplying factor corrector 44,
 binary unit 61,
 compression unit 62 for compressing the binarized corrected data, and
 decompression unit 64.
 The data memory 41 includes
 a receiving buffer region 47,
 an MPU operational processing region 45,
 a graphic processing region 46,
 a band unit display list region 52,
 a band unit multiple level raster data storage region 59, and
 a corrected, binarized and compressed raster data storage region 63 for storing the data generated by the skew.multiplying factor corrector 44, binarized at the binary means 61 and compressed by the compression unit 62.

Next, the operation of above configured printer controller is described.

When print language data or bit map data from an image scanner, a digital camera are delivered from data input means 40, the printer controller stores the data in the data memory 41 at receiving buffer region 47.

MPU 42 takes part of the translation of the print language data and storage region control of the bit map data dividing one print page into n bands, and stores the data, as display list, in the data memory 41 at band unit display list region 52. The graphic processor 43 conducts the font development operation, enlarging/shrinking, rotation, color conversion and other processing in accordance with the display list. The MPU 42 generates multiple level raster data and delivers the data to the data memory 41 to be stored at band unit multiple level raster data storage region 59 as No. N+1 band multiple raster data.

The MPU 42 reads out raster data stored in an area one band ahead, viz. No. N band multiple level raster data, from the skew.multiplying factor corrector 44, provides the data with a certain correction, converts into binary data at the binary means 61 and compresses by the compression means 62. The MPU 42 delivers the data to the data memory 41 to be stored in the corrected, binarized and compressed raster data storage region 63. As soon as the storage operation is finished, the MPU 42 delivers the data after being restored into the initial data at the decompression unit 64 to the tandem color image former 51 to have the printing operation started.

Since it is possible to overwrite the corrected data on pre-correction data when the MPU 42 corrects, binarizes and compresses the No. N band multiple level raster data and stores the data in the corrected, binarized and compressed raster data storage region 63, the data memory 41 does not need to be increased in the memory capacity. In addition, since the corrected data undergo a compression at the compression unit 62, the memory capacity of data memory 41 can be made smaller. Thus an image forming device can be implemented at a lower cost in accordance with the present embodiment. Furthermore, since the correction is conducted on the multiple level data, the result of correction is precise free from the jaggy phenomenon, which often arises as a result of bi-level correction.

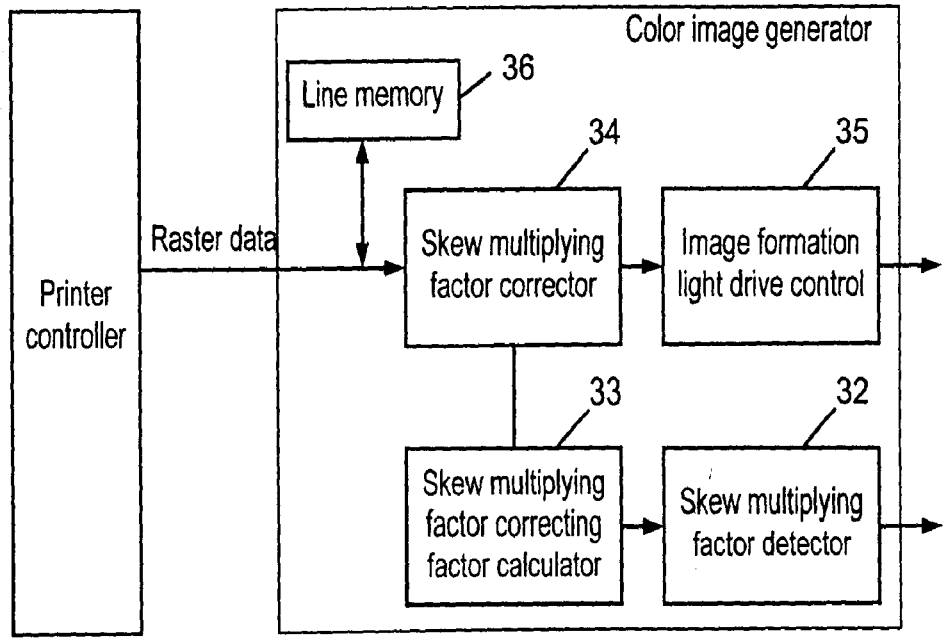

What is claimed is:

1. A printer controller for providing print data to a color image generator containing a plurality of image forming devices, said printer controller comprising:

a receiving buffer region for receiving print data;

a display list region for storing said print data;

a raster data storage region for storing, as raster data, said print data;

a skew multiplying factor corrector for correcting skew errors multiplying factor errors in said raster data; and a corrected raster data storage region for storing the corrected raster data.

2. The printer controller of claim 1, wherein said skew-.multiplying factor corrector is connected directly to said color image generator.

3. The printer controller of claim 1, wherein an amount of said skew.multiplying factor correction is determined based on at least one of:

amount of correction parameter measured at said color image generator, results of image formation obtained by delivering data for correction measurement to said color image generator, and results of measurement conducted on said color image generator.

4. A printer controller for providing print data to a color image generator containing a plurality of image forming devices comprising:

a receiving buffer region for receiving print data;

a band unit display list region for storing said print data wherein one print page corresponding to said print data is divided into n bands in the sub-scanning direction of printing by said color image generator;

a band unit raster data storage region for storing said print data as raster data;

a skew.multiplying factor corrector for correcting said raster data stored in said band unit raster data storage region; and a corrected raster data storage region for storing the corrected raster data.

5. The printer controller of claim 4, wherein said skew-.multiplying factor corrector is connected directly to said color image former.

6. The printer controller of claim 4 further comprising:

a corrected raster data storage region for storing corrected and compressed raster data, and decompression means for decompressing said corrected data.

7. The printer controller of claim 4 further comprising binary means for binarizing said corrected raster data;

a corrected and binarized raster data storage region for storing said corrected raster data after being binarized.

8. The printer controller of claim 7, wherein said binary means is connected directly to said color image generator.

9. The printer controller of claim 4 further comprising skew.multiplying factor corrector means for correcting the raster data;

binary means for binarizing the corrected data;

compression means for comprising the binarized data, and decompression means for decompressing the compressed data.

10. The printer controller of claim 4, wherein said amount of skew.multiplying factor correction is determined based on at least one of:

amount of correction parameter measured at said color image generator, results of image formation obtained by delivering data for correction measurement to said color image generator, and results of measurement conducted on said color image generator.

* * * * *

UNITED STATES PATENT AND TRADEMARK OFFICE
CERTIFICATE OF CORRECTION

PATENT NO.    : 6,371,669 B1
DATED         : April 16, 2002
INVENTOR(S)   : Hidetoshi Ikeda It is certified that error appears in the above-identified patent and that said Letters Patent is hereby corrected as shown below:

<u>Title page,</u>
Item [57], ABSTRACT, delete the abstract in its entirety and insert:

-- A printer controller provides print data to a tandem color image generator containing a plurality of electro-photographic image forming devices. The printer controller includes a receiving buffer region for receiving print data from a data input unit; an MPU operation processing region for operating the MPU; a graphic processing region for executing graphic processes; a display list region for storing, as description list covering at least one print page, the print data delivered from the data input unit; a raster data storage region for storing, as raster data, the print kept in the display list region; a corrected raster data storage region for storing the corrected data of raster data generated by a skew•multiplying factor corrector, which corrector correcting the skew errors• multiplying factor errors, for delivery to the color image former; and a data memory. Since the skew•multiplying factor correction is executed on the raster data after being forwarded into print data, the printing dislocation at color image former caused by mechanical factors can be corrected by the printer controller. --

<u>Column 10,</u>
Lines 18, 38 and 45 delete "skew.multiplying" and insert -- skew•multiplying --.

Signed and Sealed this

Fifteenth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,371,669 B1
DATED        : April 16, 2002
INVENTOR(S)  : Hidetoshi Ikeda It is certified that error appears in the above-identified patent and that said Letters Patent is hereby corrected as shown below:

Drawings,
Replace Sheet 1 of 12, Fig. 1 with:

FIG. 1

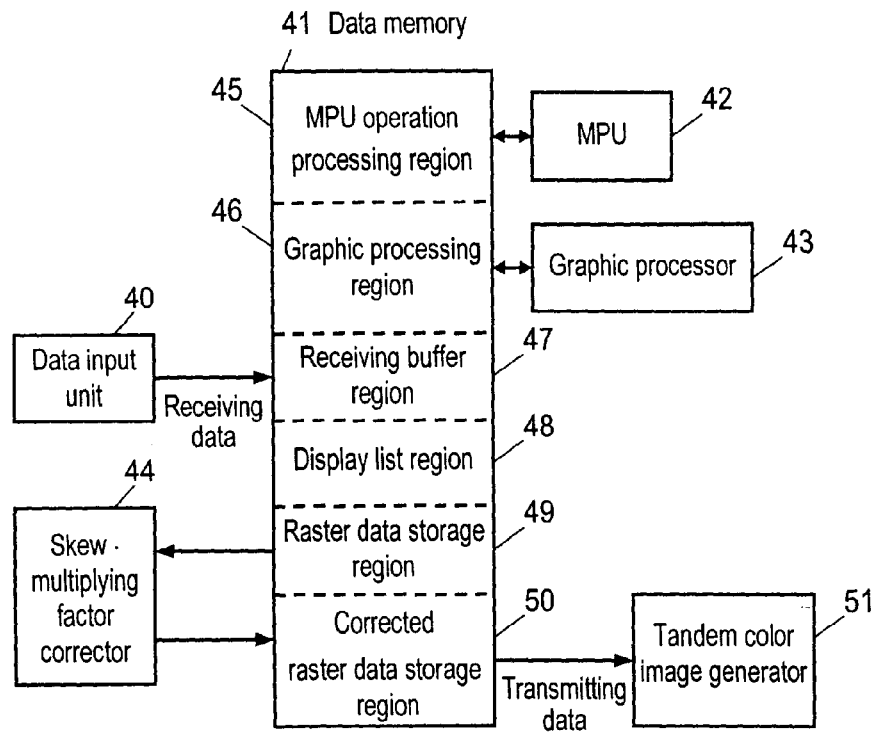

UNITED STATES PATENT AND TRADEMARK OFFICE
CERTIFICATE OF CORRECTION

PATENT NO. : 6,371,669 B1
DATED : April 16, 2002
INVENTOR(S) : Hidetoshi Ikeda

It is certified that error appears in the above-identified patent and that said Letters Patent is hereby corrected as shown below:

Drawings cont'd,
Replace Sheet 2 of 12, Fig. 2 with:

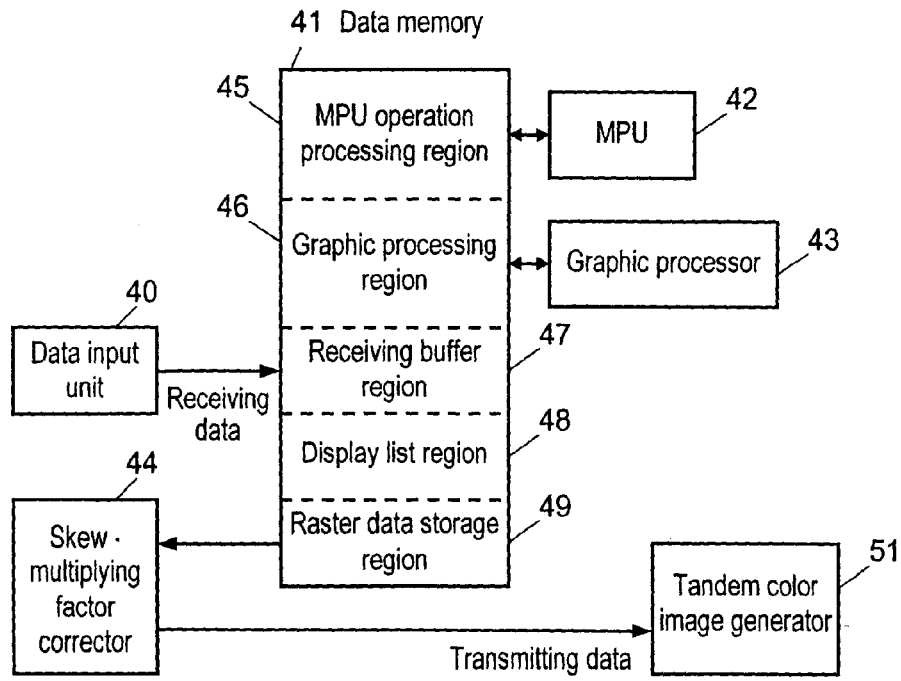

FIG. 2

UNITED STATES PATENT AND TRADEMARK OFFICE
CERTIFICATE OF CORRECTION

PATENT NO. : 6,371,669 B1
DATED : April 16, 2002
INVENTOR(S) : Hidetoshi Ikeda

It is certified that error appears in the above-identified patent and that said Letters Patent is hereby corrected as shown below:

Drawings cont'd,
Replace Sheet 3 of 12, Fig. 3 with:

FIG. 3

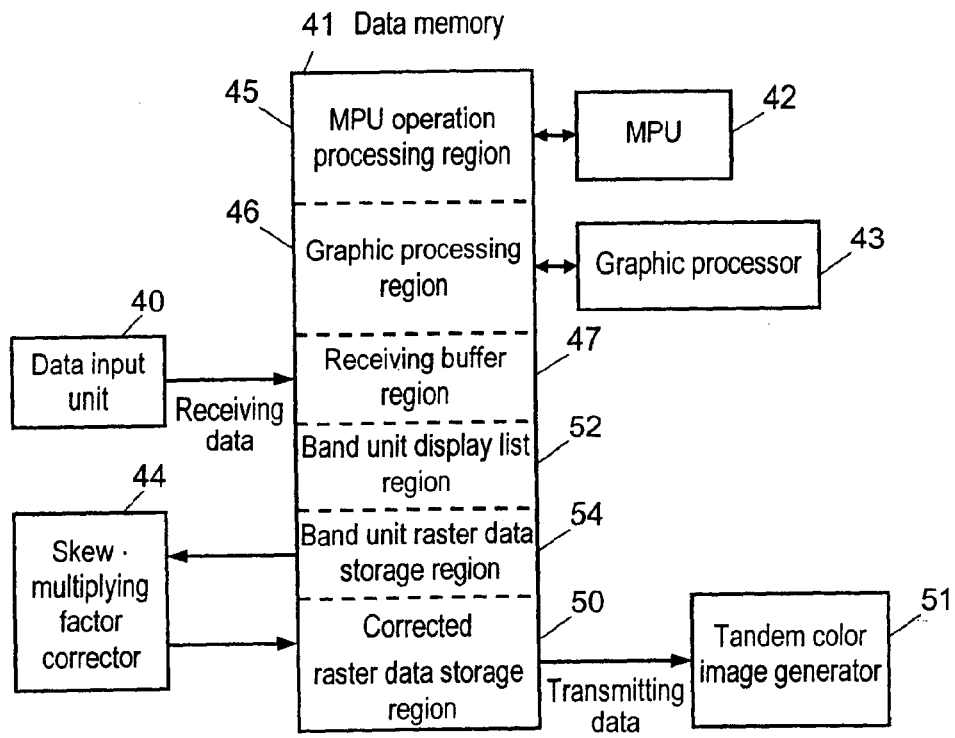

UNITED STATES PATENT AND TRADEMARK OFFICE
CERTIFICATE OF CORRECTION

PATENT NO. : 6,371,669 B1
DATED : April 16, 2002
INVENTOR(S) : Hidetoshi Ikeda

It is certified that error appears in the above-identified patent and that said Letters Patent is hereby corrected as shown below:

Drawings cont'd,
Replace Sheet 4 of 12, Fig. 4 with:

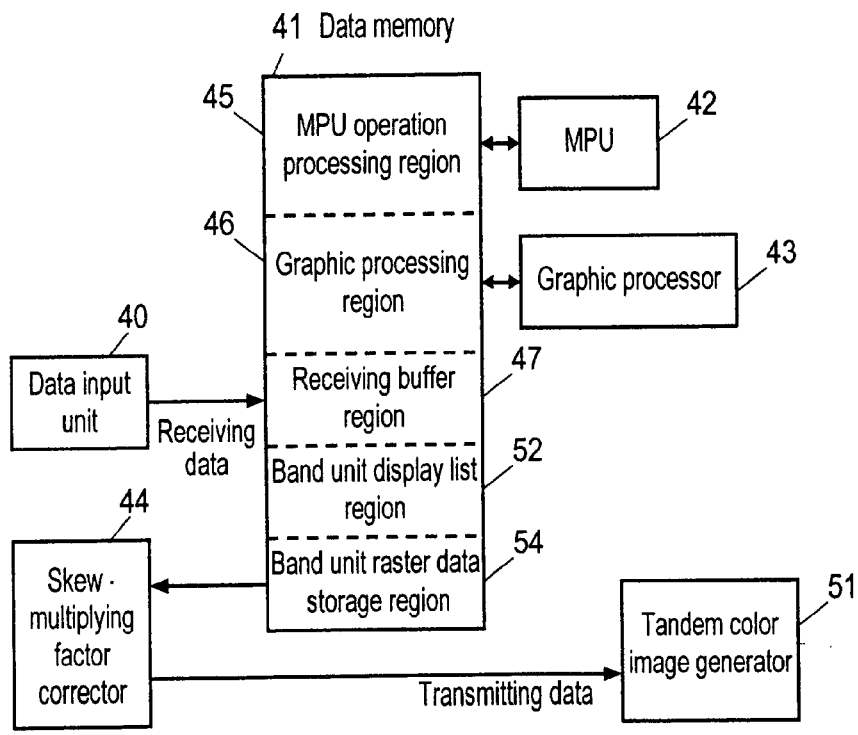

FIG. 4

UNITED STATES PATENT AND TRADEMARK OFFICE
CERTIFICATE OF CORRECTION

PATENT NO. : 6,371,669 B1
DATED : April 16, 2002
INVENTOR(S) : Hidetoshi Ikeda

It is certified that error appears in the above-identified patent and that said Letters Patent is hereby corrected as shown below:

Drawings cont'd,
Replace Sheet 5 of 12, Fig. with:

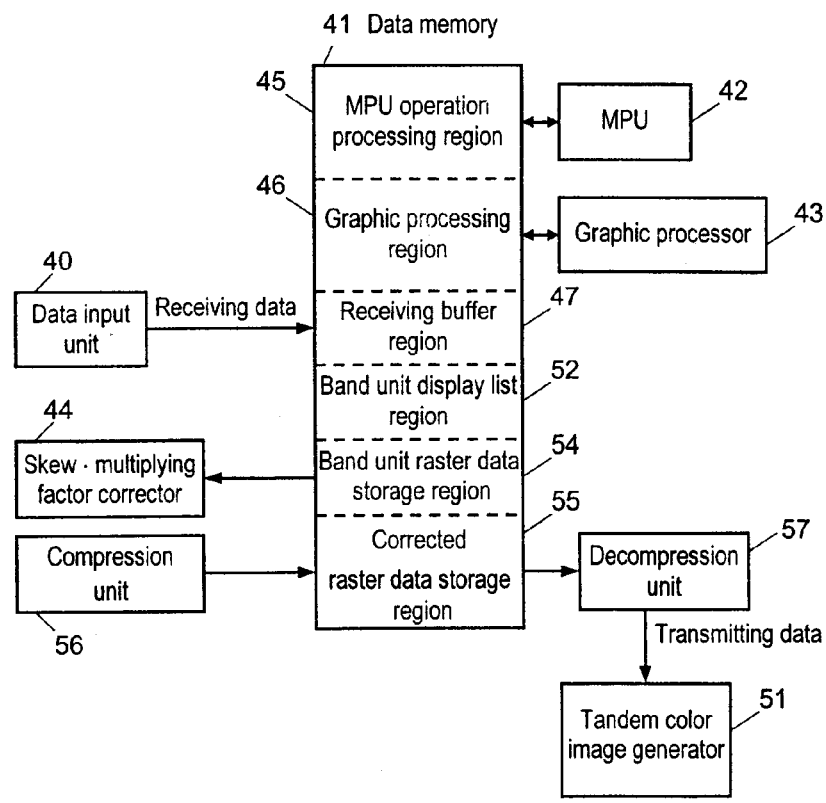

FIG. 5

UNITED STATES PATENT AND TRADEMARK OFFICE
CERTIFICATE OF CORRECTION

PATENT NO. : 6,371,669 B1
DATED : April 16, 2002
INVENTOR(S) : Hidetoshi Ikeda

It is certified that error appears in the above-identified patent and that said Letters Patent is hereby corrected as shown below:

Drawings cont'd,
Replace Sheet 6 of 12, Fig. 6 with:

FIG. 6

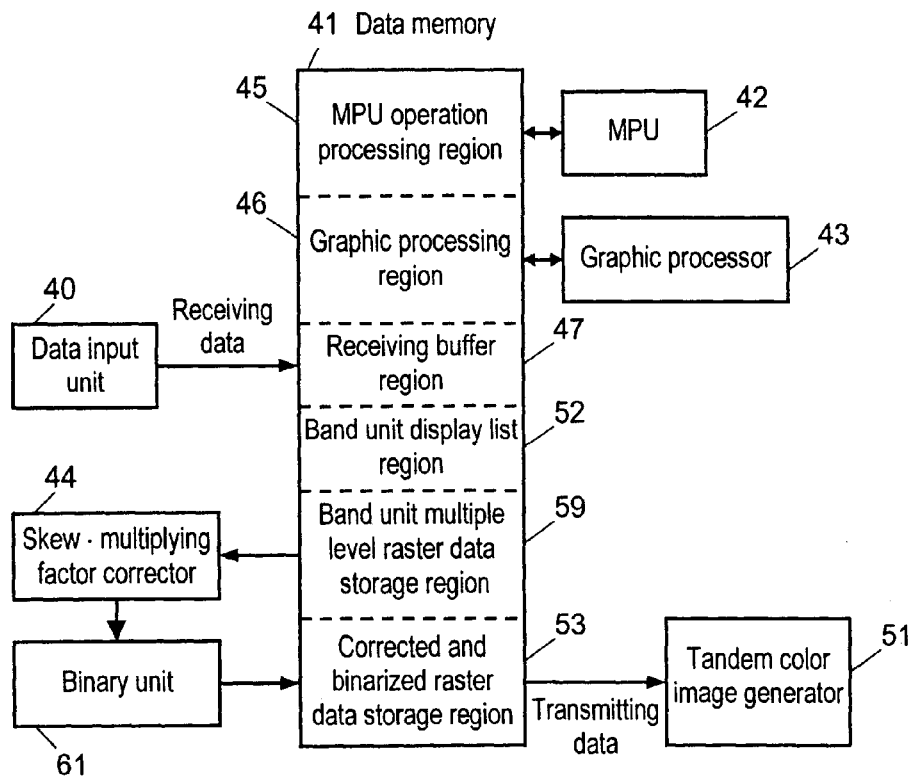

UNITED STATES PATENT AND TRADEMARK OFFICE
CERTIFICATE OF CORRECTION

PATENT NO.   : 6,371,669 B1
DATED        : April 16, 2002
INVENTOR(S)  : Hidetoshi Ikeda It is certified that error appears in the above-identified patent and that said Letters Patent is hereby corrected as shown below:

Drawings cont'd,
Replace Sheet 7 of 12, Fig. 7 with:

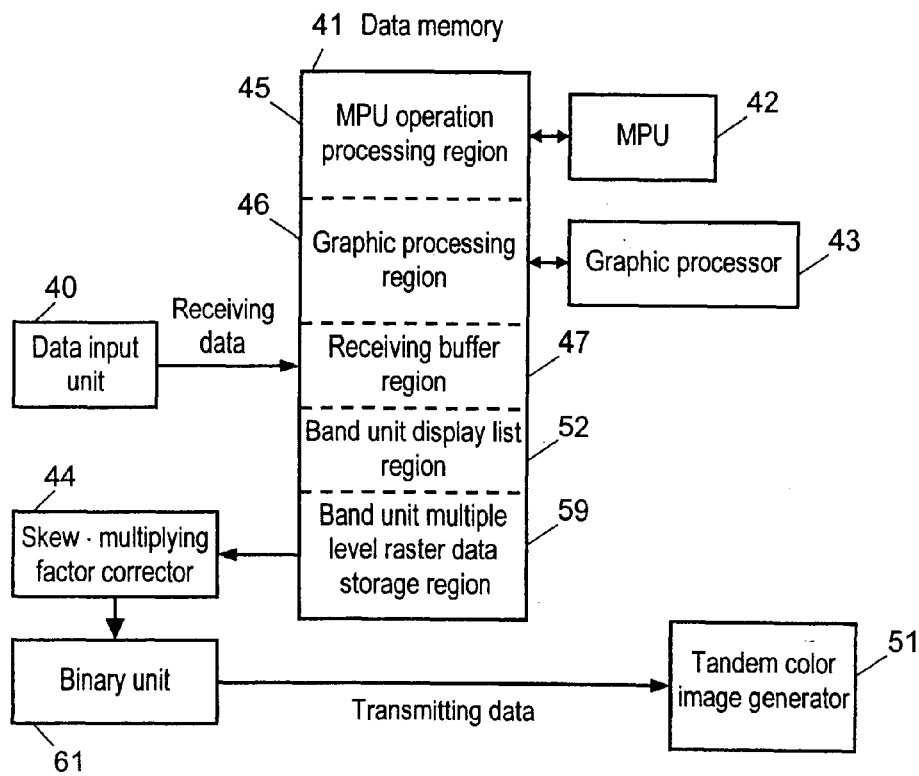

FIG. 7

UNITED STATES PATENT AND TRADEMARK OFFICE
CERTIFICATE OF CORRECTION

PATENT NO. : 6,371,669 B1
DATED : April 16, 2002
INVENTOR(S) : Hidetoshi Ikeda

It is certified that error appears in the above-identified patent and that said Letters Patent is hereby corrected as shown below:

Drawings cont'd,
Replace Sheet 8 of 12, Fig. 8 with:

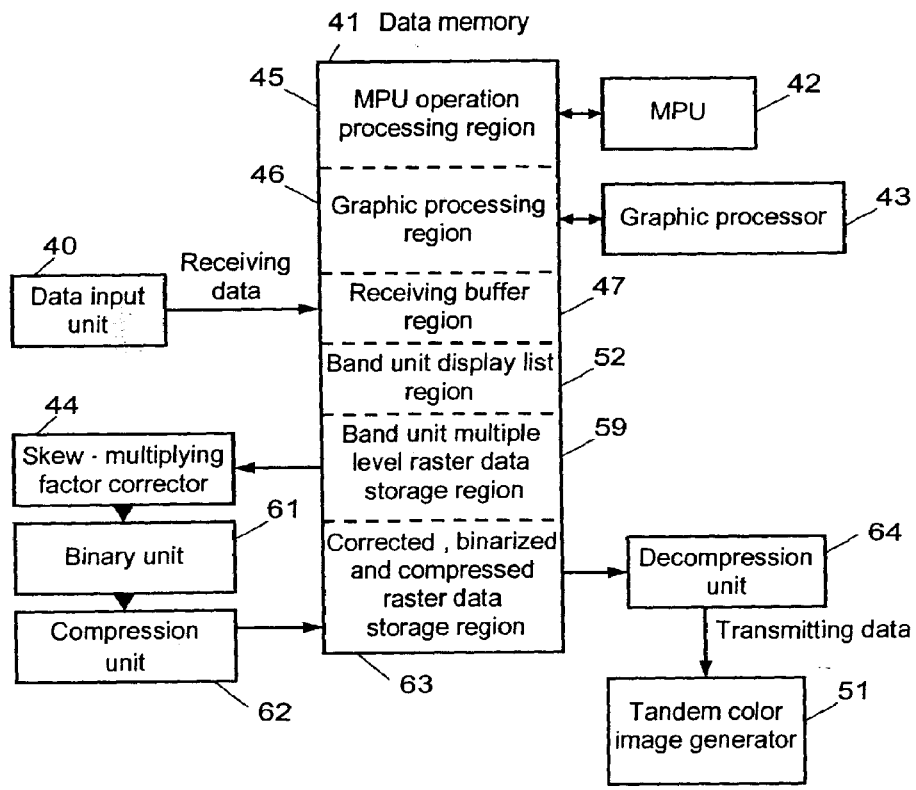

FIG. 8

UNITED STATES PATENT AND TRADEMARK OFFICE
CERTIFICATE OF CORRECTION

PATENT NO. : 6,371,669 B1
DATED : April 16, 2002
INVENTOR(S) : Hidetoshi Ikeda

Figure 9:
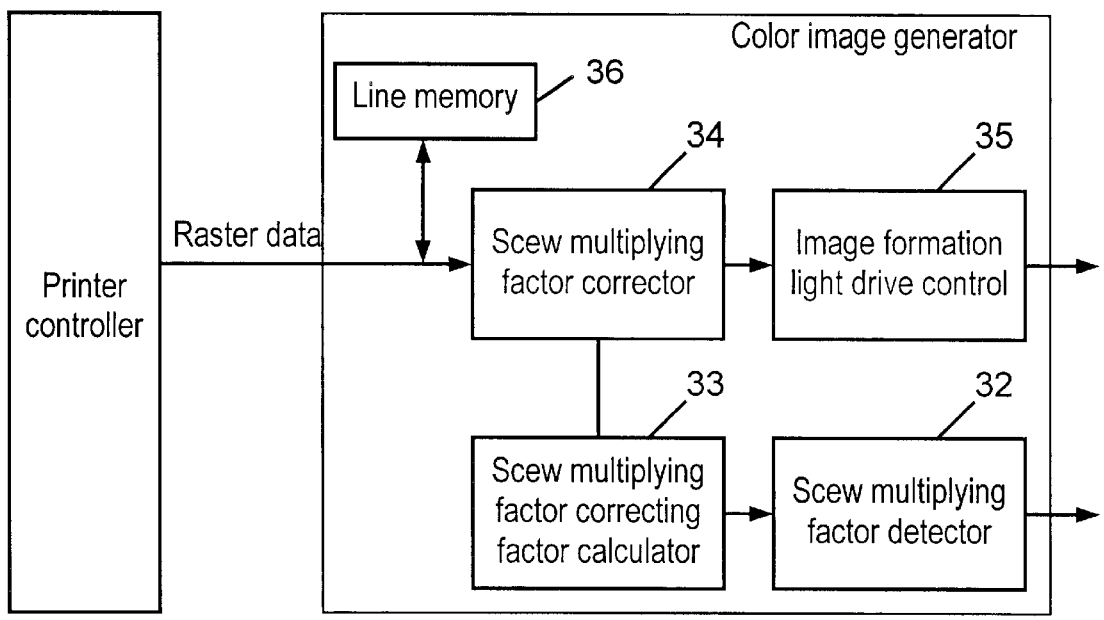
FIG. 9 is a block diagram showing a connection between a printer controller and a color image generator in the exemplary embodiments of the present invention.
Figure 10:
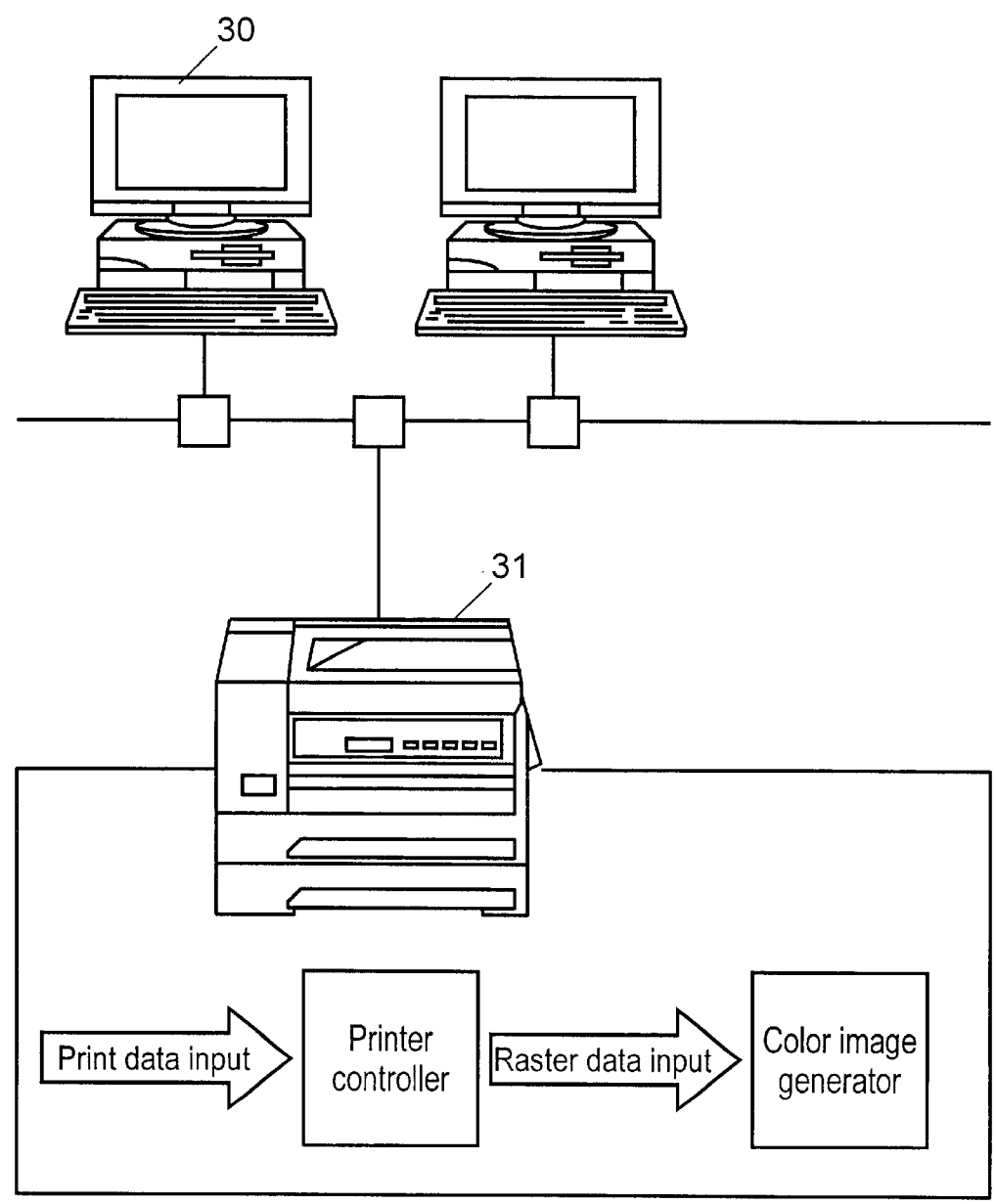
FIG. 10 shows a data flow when a printer prints data.
Figure 11:
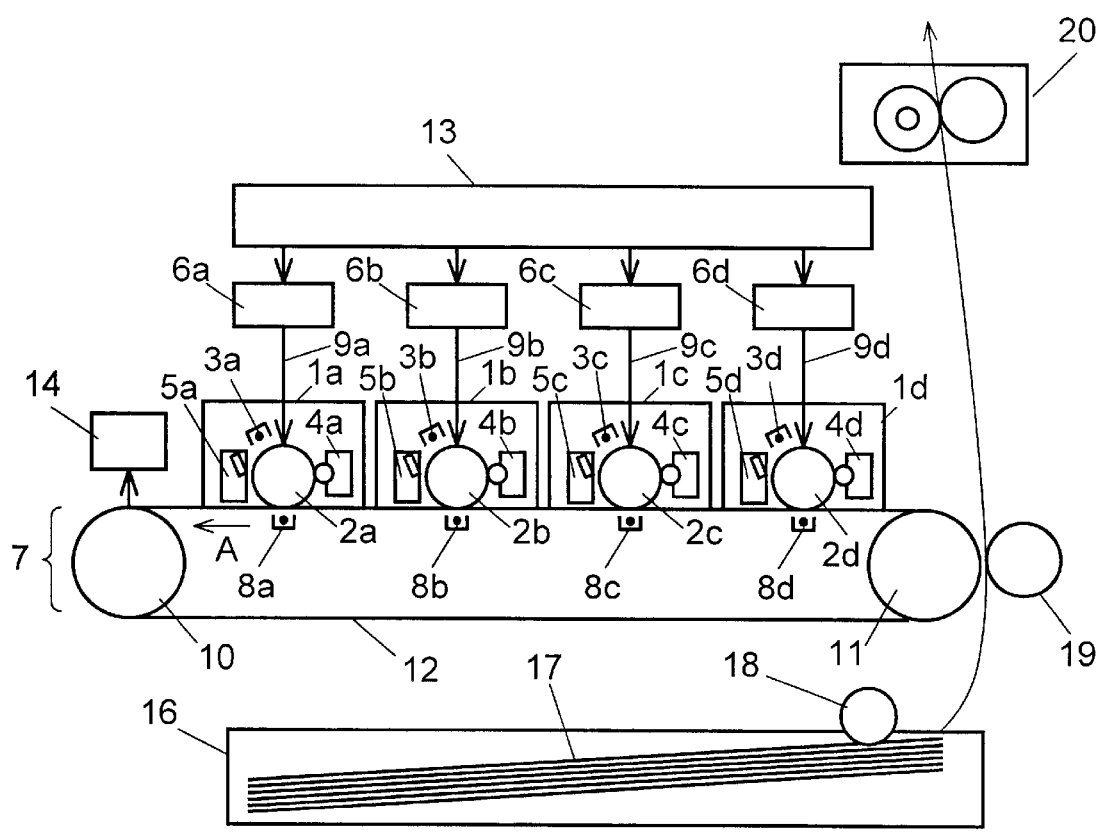
FIG. 11 illustrates the structure of a tandem color image former.
Figure 12A:
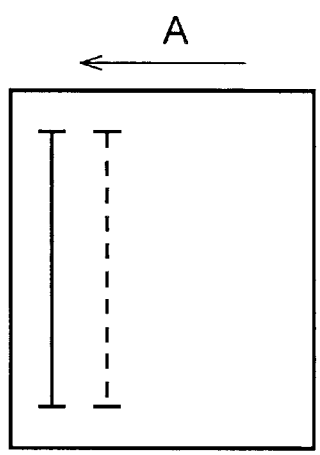
FIGS. 12A–E shows the dislocation patterns in a transferred image.
Figure 12B:
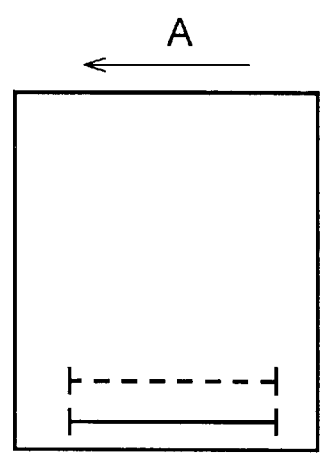
Figure 12C:
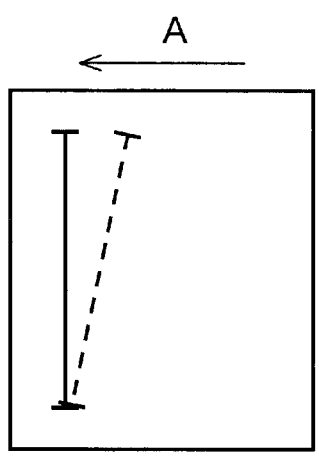
Figure 12D:
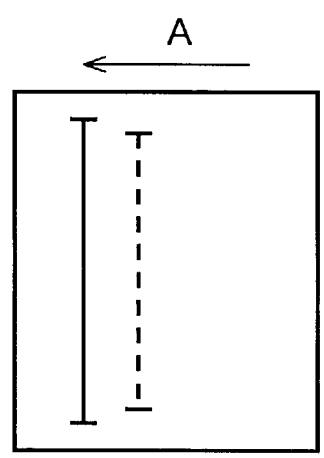
Figure 12E:
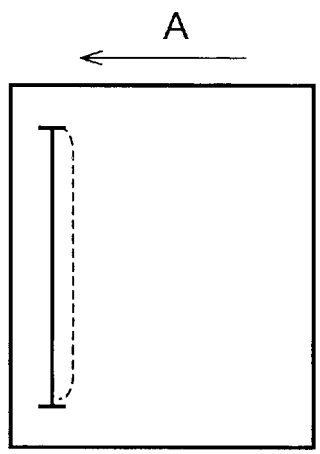

It is certified that error appears in the above-identified patent and that said Letters Patent is hereby corrected as shown below:

Drawings cont'd,
Replace Sheet 9 of 12, Fig. 9 with:

FIG. 9